(No Model.) 2 Sheets—Sheet 2.
S. TRETHEWEY.
SHEARING MACHINE.
No. 490,777. Patented Jan. 31, 1893.
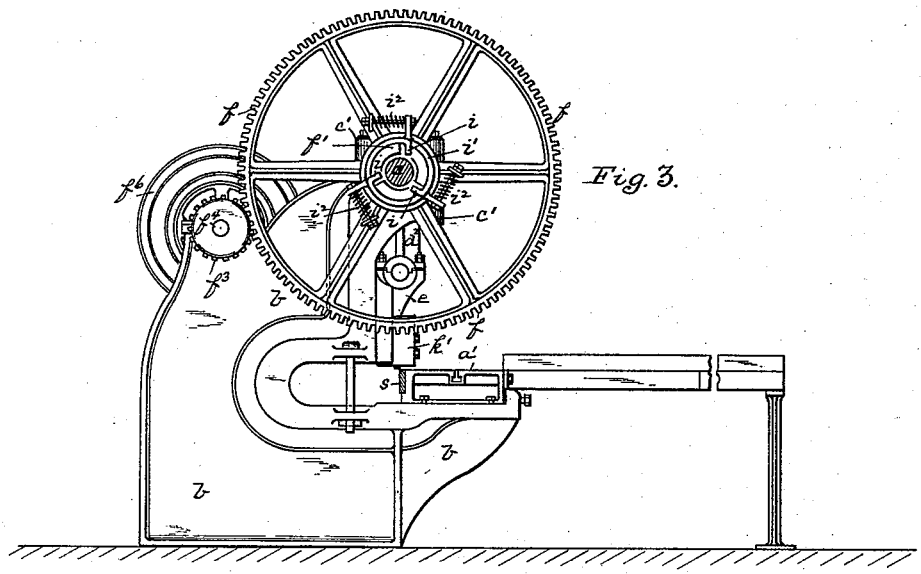
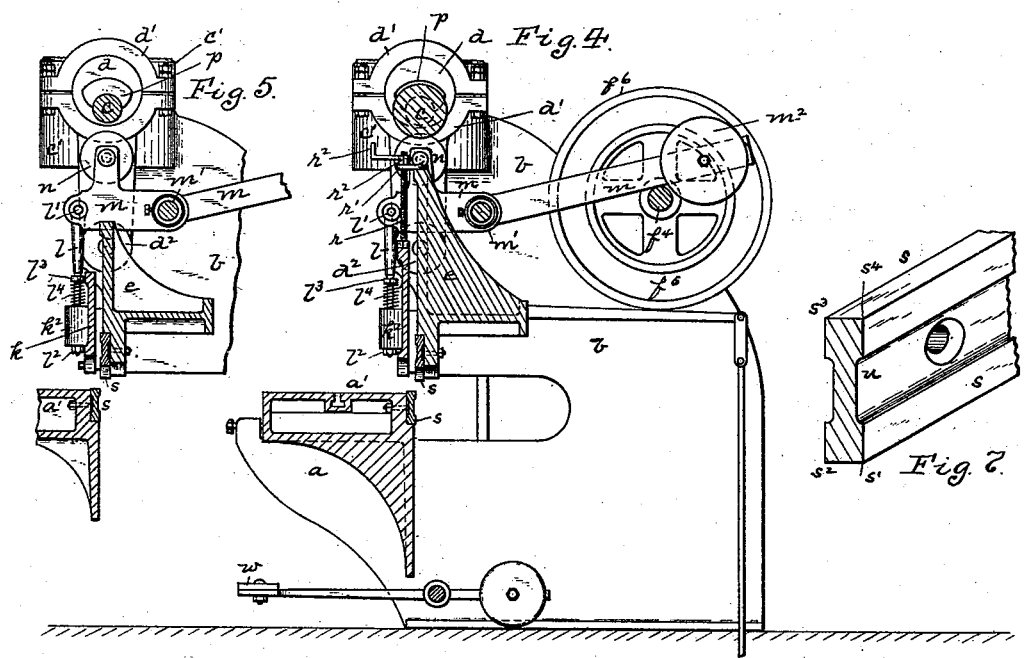
Witnesses:
J. N. Cooke
E. A. Wenk
Inventor:
Samuel Trethewey
By Kay & Totten
Attorneys

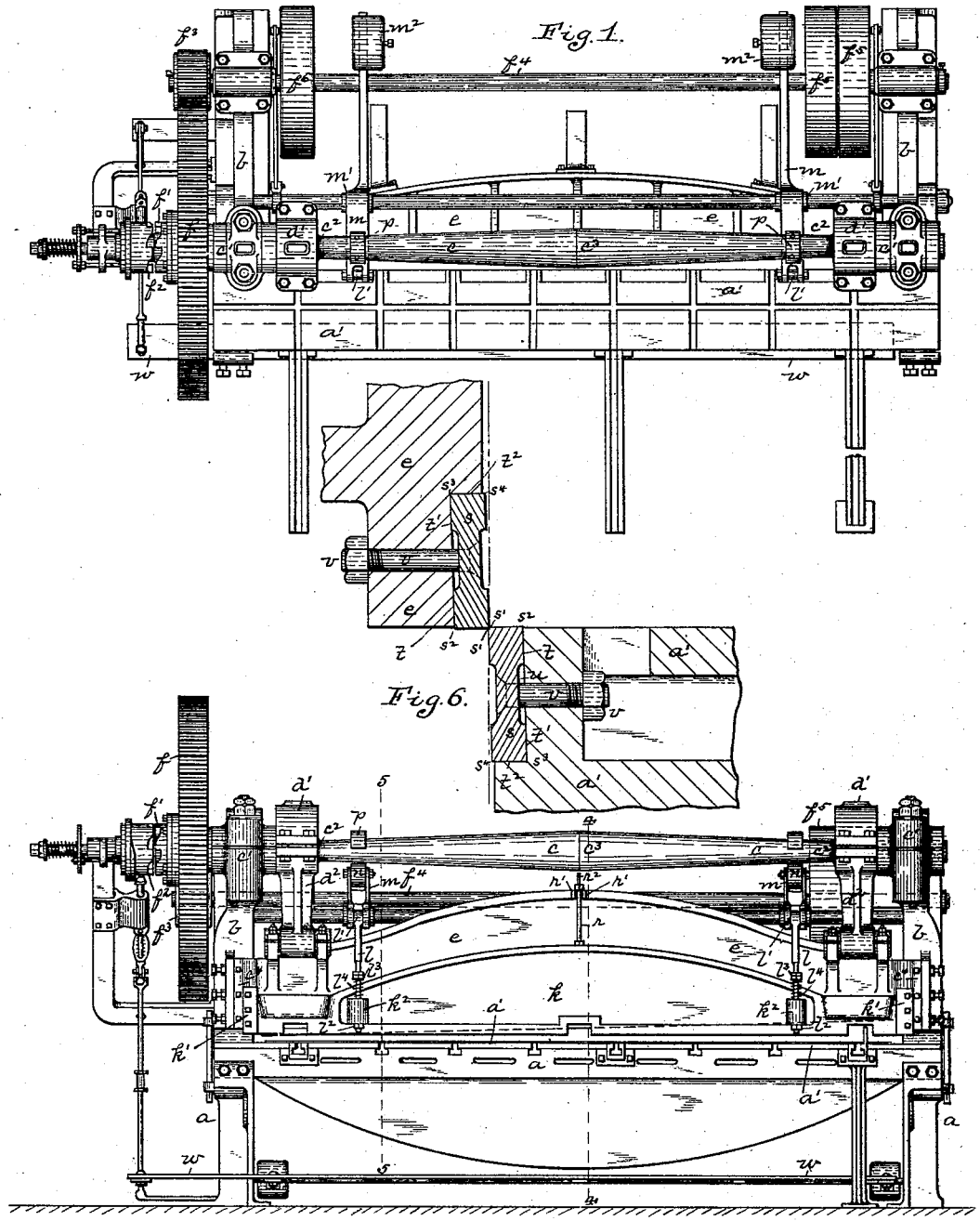

UNITED STATES PATENT OFFICE.

SAMUEL TRETHEWEY, OF PITTSBURG, PENNSYLVANIA, ASSIGNOR TO THE TRETHEWEY MANUFACTURING COMPANY, OF SAME PLACE.

SHEARING-MACHINE.

SPECIFICATION forming part of Letters Patent No. 490,777, dated January 31, 1893.

Application filed April 16, 1892. Serial No. 429,448. (No model.)

*To all whom it may concern:*

Be it known that I, SAMUEL TRETHEWEY, a resident of Pittsburg, in the county of Allegheny and State of Pennsylvania, have invented a new and useful Improvement in Shearing-Machines; and I do hereby declare the following to be a full, clear, and exact description thereof.

My invention relates to metal shearing apparatus, the mechanism desired to be covered being principally applicable to the shearing of long lengths of sheet metal. The special points desired to be covered relate to the manner of holding the shearing knives, and the mechanism for holding down sheets during the shearing operation. I have provided knives for these shearing machines with four cutting edges, forming the knives rectangular in cross section, and forming a shearing edge at each rectangular corner of the knife, and I have provided for the necessary clearance by forming the back of the knife seat receding so that when the rectangular knife is secured therein the necessary clearance therefor is obtained. In these machines for shearing sheet metal, it has been customary to form the "hold-down" with a positive movement from the mechanism operating to press it down upon the sheets, the hold-down being adjusted so as to take in the thickness of the bodies of the sheets according to the number which it is set to cut. It is found that in some cases, more sheets are fed to the machine than that which it is set to cut, and in that case when the hold-down is pressed upon the sheets by such positive mechanism, it requires greater space between the feeding table and the bottom face of the hold-down than the hold-down is arranged to receive, and therefore, as positive pressure is employed, there is great liability of the breaking of some of the parts of the machine. In my improved shearing machine the vertically movable hold-down operates independently of the knife carrier and has a spring or yielding connection with its operating mechanism, so that in case of such unusual strain the springs will be compressed and all liability of breakage of the machine is overcome.

The principal points desired to be covered by this invention will be hereinafter more fully set forth and claimed.

To enable others skilled in the art to make and use my invention, I will describe its construction and operation, referring to the accompanying drawings in which Figure 1 is a plan view of a shearing machine embodying my invention; Fig. 2 is a face view of the same; Fig. 3 is an end view thereof; Fig. 4 is a cross section on the line 4—4, Fig. 2; Fig. 5 is a detail cross section on the line 5—5, Fig. 2; Fig. 6 is an enlarged detail view showing the shearing knives in position in the table and knife carrier; and Fig. 7 is a perspective view showing a portion of one of the knives.

Like letters of reference indicate like parts in each of the views.

My invention is illustrated in connection with a sheet shearing machine, the machine being illustrated in the proportions of a shearing machine for cutting sheets up to one hundred and twenty-four inches in length, though the machine may, of course, be employed in any shearing work to which it is adapted. It will be understood that in such machine it is necessary to have the parts constructed of great strength so as to obtain the necessary rigidity in cutting a stroke of that length. The machine has the bed $a$ which is provided with the table $a'$ over which the sheet is fed to the cutting knives. Supported in the frame $b$ of the machine is the cutting or eccentric shaft $c$ which is mounted in suitable bearings $c'$ and is provided with eccentrics $d$ fitting within boxes $d'$ and connected to the reciprocating knife carrier $e$ by the eccentric straps $d^2$. The eccentric shaft $c$ is turned by suitable power mechanism, said shaft having the gear wheel $f$ mounted thereon and having a suitable clutch face $f'$ with which the clutch $f^2$ engages, the gear wheel $f$ being driven by the pinion $f^3$ on the shaft $f^4$ which is rotated by suitable mechanism, being shown as provided with the pulleys $f^5$ and having the fly wheel $f^6$. The clutch $f^2$ is connected by a feather to the cutting or eccentric shaft $c$ and is operated by suitable mechanism which it is not necessary here to describe, the clutch being illustrated in the application for patent filed by me December 7, 1891, Serial No. 414,232, while another feature of the clutch, namely, the spring operated clutch bars $i$ secured to the ring $i'$ mounted in a suitable seat or bearing in the gear wheel $f$ and around the shaft $c$, and having springs $i^2$, also forms the subject matter of an application of even date herewith, Serial No. 429,447. The purpose of such clutch fingers so mounted is to provide spring faces in the clutch mechanism which will engage with the clutch faces of the clutch member $f^2$ and by pressing against the same will impart the initial rotation to the eccentric shaft and operative parts of the machine without jar, as the springs $i^2$ are gradually compressed by means of such fingers until the fingers rest solidly against the shoulders of the clutch face $f'$ and are held between the same and the shoulders of the clutch member $f^2$, so imparting a gradual movement to the shaft through the medium of such heavy springs and relieving it of jar, but said springs yielding so that when said shaft is started in its movement the positive driving of the same through the positive clutch is obtained. The eccentric shaft $c$ increases gradually in thickness and diameter from the ends where the eccentrics are secured thereto, as at $c^2$, to the center thereof, as at $c^3$, the increase in the diameter of the shaft toward the center being found to act practically as a truss or in some other way to largely increase the strength of the eccentric shaft and cause the positive operation of the eccentrics in unison, all liability of injury by twisting strain upon the eccentric shaft being overcome, while the peculiar quivering or vibrating movement of this shaft, which occurs in shafts of the same diameter throughout, where employed in these large shearing machines is overcome, a steady, regular and powerful movement being obtained.

The hold-down for the machine, shown at $k$, is mounted in suitable guide-ways $k'$ back of the guide-ways $c^4$ of the reciprocating knife carrier, the hold-down extending the full length of the machine in front of the knife carrier. It is hung from bars $l$ which are connected at $l'$ to the lever $m$ pivoted at $m'$ and carrying the weight $m^2$, said lever having the rollers $n$ mounted in suitable bearings therein which extend up below the eccentric shaft $c$, and said shaft having cams $p$ secured thereto which by pressing upon the rollers $n$ force down the lever $m$ and through the bars $l$ force down the hold-down upon the metal; the hold-down being raised by the counterbalancing weights $m^2$ at the free ends of the levers $m$. By the above form of construction, the hold down moves independently of the knife carrier in the sense that it advances and clamps the sheets previous to the descent of the knife carrier. To provide for inequalities in thickness of the metal fed to the machine, as above described, the bars $l$ are connected to the hold-down in the following manner:—On the hold-down are the vertical sockets $k^2$ through which the bars $l$ pass, said bars having nuts $l^2$ at their lower ends for adjusting the height of the hold-down. On said bars $l$ are the shoulders $l^3$ and between the top faces of the sockets $k^2$ and said shoulders the springs $l^4$ are confined so that the springs press upon the top faces of the sockets. The springs $l^4$ are stiff and strong so as to withstand heavy strains, as, for example, the strain brought upon sheet iron in the ordinary shearing operation, the springs being of sufficient strength to enable the hold-down to hold the metal to place during the shearing operation. Where, however, a body of metal of greater thickness is placed under the hold-down, such for example, as where several extra sheets of metal are fed under the machine, in such case as the hold-down forces the surfaces of the several sheets firmly against each other where the parts are positively connected, such heavy strain as might lead to the breaking of the machine would be brought upon the parts. In the present construction, however, the springs $l^4$ will yield slightly, according to the extra thickness of metal fed to the machine, and the hold-down will act effectively to retain the metal in place, and at the same time accommodate itself to the extra thickness of metal through the yielding connection between the hold-down and its operative mechanism.

In these shearing machines where it ha been necessary to change or adjust the knife in the reciprocating knife carrier, it has been found necessary to remove the hold-down from the machine, which operation entailed considerable labor. To overcome this difficulty I have provided the following device: Secured to the top of the hold-down at about the center thereof is the vertical bolt $r$ which passes up in front of the knife carrier between the lugs or fingers $r'$ on the top edge of the knife carrier, these fingers extending out horizontally on each side of the bolt $r$. When it is desired to set or adjust the knife in the knife holder, it is lowered to about the position shown in Fig. 4 and the operative mechanism of the hold-down is disengaged therefrom, such, for example, as by disengaging the bars $l$ from the lever $m$, and the crank nut $r^2$ is then screwed upon the bolt $r$ above the fingers $r'$, and by turning the same upon the threaded bolt $r$ the hold-down is raised as high as desired, so giving to the operator free access to the knife in the knife-carrier without the necessity of disengaging the hold-down from the machine. As soon as the knife is set or adjusted, the hold-down can be lowered in the same way and again connected to its operative mechanism when it will be ready for use; such means, while overcoming a large amount of labor in handling such machines, has the further advantage of providing for the setting of the knives without interfering with the adjustment of the hold-down. The bolt $r$ may be made removable from the hold-down.

The knives employed with the machine are preferably such as more clearly illustrated in Figs. 6 and 7, being formed of rectangular bars $s$ which bars are formed of hard steel of the proper carbon, and as will be seen, each knife has four cutting edges at the four edges $s'$, $s^2$, $s^3$, $s^4$, thereof. These knives can therefore be made and furnished so that all four corners form cutting edges, and as a result thereof the knives are reversible and interchangeable, and may be employed for either the top or bottom of the machine, that is, either with the reciprocating knife carrier $e$ or the table $a'$. In order to provide a suitable relief for the knives, the back faces $t'$ of the seats $t$ are formed slightly receding, according to the amount of relief or clearance required, the back faces $t'$ of each seat being made receding from the face of the knife carrier or table where the shearing takes place; that is to say, that the distance from such face at the base of each seat is greater than such distance at the edge at the shearing point in use. The lower face $t^2$ of the seat is also made at right angles to said back face so that a solid seat for the knife is obtained. It will also be noticed that along the face of each knife between the shearing edges thereof is the longitudinal depression $u$; such depression in the first place provides a seat to receive the heads of the securing bolts $v$ which pass through suitable bolt holes in the knife, and they perform a further important function, namely, that in the grinding and sharpening of these rectangular knives they may be placed flat upon the grind-stone and ground to bring them to proper edge, and the two shearing edges on that side of the knife may be ground or sharpened at the same time without the necessity of grinding away the entire body of metal of the knife, the grinding of the knives being thus greatly facilitated by reducing the surface necessary to be ground or cut away, and the necessity of such careful work in sharpening the knives being prevented, it only being necessary that in the sharpening operation the knives shall be kept perfectly horizontal, the still further advantage of sharpening the two cutting edges at the same time being obtained. The same advantage is obtained where the knives are sharpened by planing from the surface thereof, as it is only necessary that the knives shall be placed flat upon the lathe and both cutting edges on one face of the knife can thus be sharpened on the lathe, while it is secured thereto. As the knives wear away they can be adjusted for cutting by liners placed between them and the back faces $t'$ of the seats $t$, which liners may be of the same thickness through-out so that an easy adjustment is obtained.

In the operation of the machine, after the knives have been properly set and the hold-down adjusted, when a cut is to be made the machine is started and the gear wheel $f$ rotates continuously through the mechanism above described. The operator then feeds the metal under the hold-down the distance desired, which is, of course, fixed by suitable gages, and places his foot upon the treadle $w$ which causes the clutch to engage with the driving gear $f$ so connecting the eccentric shaft with the power mechanism. As the eccentric shaft is rotated, the cams $p$ thereon, through the mechanism above described, force down the hold-down $k$ which clamps the sheets upon the table, and the reciprocating knife carrier $e$ is then forced down and through the shearing knives the sheets are sheared for the length of the machine. In case a greater thickness is fed to the machine than the hold-down is adjusted to receive, it will yield slightly, compressing the springs $l^4$ and so accommodate itself to the thickness of the metal fed to the machine, and will properly hold the metal while it is being sheared. During this operation the quivering or vibrating movement of the eccentric shaft is overcome on account of the gradual increase of thickness of the same from the ends toward the center, as above described. When the knives are to be set or adjusted, the hold-down can be raised by the bolt $r$, as above described, and easy access to the shearing knives thus obtained. The shearing knives can be used without the necessity of sharpening until the four cutting edges $s'$, $s^2$, $s^3$, $s^4$, of the rectangular shearing knives all require sharpening, it being only necessary to readjust the knives so as to present a new cutting edge when the others are dulled, this being easily accomplished as the knives are reversible and interchangeable and can be used in either the top or bottom knife carrier. When all the edges are dull, they can be easily and rapidly sharpened as above described.

What I claim as my invention, and desire to secure by Letters Patent, is:—

1. In a metal shearing apparatus, the combination of a rectangular shearing knife having cutting edges at each corner thereof, and a knife carrier having a seat provided with a back face against which the knife fits receding from the face where the shearing takes place, to give clearance to the knife, substantially as and for the purposes set forth.

2. In a metal shearing apparatus, the combination of a table having a shearing knife, a reciprocating knife carrier having a shearing knife, the vertically movable hold-down $k$ having sockets $k^2$, the operating levers $m$, weights $m^2$, on said levers $m$ rollers $n$, journaled in said levers, the shaft $c$ cams $p$ carried thereby and adapted to press upon the rollers $n$ the bolts $l$ connected to said levers and passing through the sockets $k^2$, and the springs $l^4$ confined between said sockets and shoulders on said bolts, substantially as and for the purposes set forth.

In testimony whereof I, the said SAMUEL TRETHEWEY, have hereunto set my hand.

SAMUEL TRETHEWEY.

Witnesses:
J. N. COOKE,
ROBT. D. TOTTEN.